US012580210B2

(12) United States Patent
Kvist et al.

(10) Patent No.: US 12,580,210 B2
(45) Date of Patent: Mar. 17, 2026

(54) HYDROGEN GAS SUPPLY SYSTEM

(71) Applicant: Volvo Truck Corporation, Gothenburg (SE)

(72) Inventors: Roland Kvist, Braås (SE); Gordon Ekman, Moheda Småland (SE)

(73) Assignee: Volvo Truck Corporation, Gothenburg (SE)

( * ) Notice: Subject to any disclaimer, the term of this patent is extended or adjusted under 35 U.S.C. 154(b) by 627 days.

(21) Appl. No.: 18/084,735

(22) Filed: Dec. 20, 2022

(65) Prior Publication Data

US 2023/0197987 A1 Jun. 22, 2023

(30) Foreign Application Priority Data

Dec. 22, 2021 (EP) ..................................... 21216892

(51) Int. Cl.
  *B60K 15/03* (2006.01)
  *B60L 50/70* (2019.01)
  (Continued)

(52) U.S. Cl.
  CPC ......... *H01M 8/04201* (2013.01); *B60K 15/03* (2013.01); *B60L 50/70* (2019.02);
  (Continued)

(58) Field of Classification Search
  CPC ........... F02M 21/0206; F02M 21/0218; F02M 21/0221; F02M 21/0224; F17C 2201/056;
  (Continued)

(56) References Cited

U.S. PATENT DOCUMENTS

| 2010/0248063 A1 | 9/2010 | Hwang et al. |
| 2012/0318378 A1 | 12/2012 | Yahashi et al. |
| (Continued) | | |

FOREIGN PATENT DOCUMENTS

| JP | 2011007229 A | 1/2011 |
| WO | 2021018457 A1 | 2/2021 |

OTHER PUBLICATIONS

Intention to Grant for European Patent Application No. 21216892.6, mailed May 19, 2025, 26 pages.
(Continued)

*Primary Examiner* — Marina A Tietjen
(74) *Attorney, Agent, or Firm* — Withrow & Terranova, PLLC

(57) ABSTRACT

A hydrogen gas supply system for a hydrogen consuming energy converter arranged onto a vehicle comprising a plurality of tanks for storage of pressurized hydrogen gas, wherein each tank is provided with a valve configured to control the flow of hydrogen from the corresponding tank into a flow line connected to the hydrogen consuming energy converter, wherein the plurality of tanks comprises one or more primary tanks, each of which being provided with a corresponding primary hydrogen flow control valve, the plurality of tanks further comprising a secondary tank provided with a corresponding secondary hydrogen flow control valve, wherein the hydrogen gas supply system is arranged so that the secondary tank contains a smaller maximum working amount of pressurized hydrogen, and/or so that the flow of hydrogen from the secondary tank is restricted.

16 Claims, 2 Drawing Sheets

(51) Int. Cl.

| | |
|---|---|
| *F02M 21/02* | (2006.01) |
| *F17C 1/00* | (2006.01) |
| *F17C 7/00* | (2006.01) |
| *H01M 8/04082* | (2016.01) |
| *H01M 8/04746* | (2016.01) |

(52) U.S. Cl.

CPC .... *F02M 21/0206* (2013.01); *F02M 21/0218* (2013.01); *F02M 21/0221* (2013.01); *F02M 21/0224* (2013.01); *F17C 1/00* (2013.01); *F17C 7/00* (2013.01); *H01M 8/04753* (2013.01); *B60K 2015/03256* (2013.01); *B60K 2015/03315* (2013.01); *F17C 2201/056* (2013.01); *F17C 2205/0142* (2013.01); *F17C 2205/0323* (2013.01); *F17C 2221/012* (2013.01); *F17C 2223/0123* (2013.01); *F17C 2223/036* (2013.01); *F17C 2250/032* (2013.01); *F17C 2250/034* (2013.01); *F17C 2250/043* (2013.01); *F17C 2250/0478* (2013.01); *F17C 2250/0636* (2013.01); *F17C 2260/035* (2013.01); *F17C 2265/066* (2013.01); *F17C 2270/0168* (2013.01); *F17C 2270/0184* (2013.01); *H01M 2250/20* (2013.01); *Y02E 60/32* (2013.01)

(58) Field of Classification Search

CPC ...... F17C 2205/0142; F17C 2205/0323; F17C 2221/012; F17C 2223/0123; F17C 2223/036; F17C 2250/032; F17C 2250/034; F17C 2250/043; F17C 2250/0478; F17C 2250/0636; F17C 2260/035; F17C 2265/066; F17C 2270/0168; F17C 2270/0184; Y02E 60/32

See application file for complete search history.

(56) References Cited

U.S. PATENT DOCUMENTS

| | | | |
|---|---|---|---|
| 2015/0010839 A1 | 1/2015 | Yoshida et al. | |
| 2016/0133966 A1 | 5/2016 | Komiya et al. | |
| 2019/0093826 A1* | 3/2019 | Araki | F17C 13/025 |
| 2020/0091525 A1 | 3/2020 | Fujita | |
| 2020/0119378 A1 | 4/2020 | Min et al. | |

OTHER PUBLICATIONS

Extended European Search Report for European Patent Application No. 21216892.6, mailed May 25, 2022, 10 pages.

\* cited by examiner

HYDROGEN GAS SUPPLY SYSTEM

RELATED APPLICATIONS

The present application claims priority to European Patent Application No. 21216892.6, filed on Dec. 22, 2021, and entitled "HYDROGEN GAS SUPPLY SYSTEM," which is incorporated herein by reference in its entirety.

TECHNICAL FIELD

The invention relates to a hydrogen gas supply system for a hydrogen consuming energy converter arranged onto a vehicle. The invention further relates to a vehicle provided with a hydrogen consuming energy converter and such a hydrogen gas supply system, and to a method for operating such a hydrogen gas supply system.

The invention may, for instance, be applied in vehicles, such as heavy-duty vehicles in the form of trucks, buses and construction equipment, where the hydrogen consuming energy converter is a fuel cell or an internal combustion engine.

BACKGROUND

There is global desire to reduce the use of fossil fuels in vehicles and other applications. An interesting alternative fuel is hydrogen gas that can be used in a hydrogen consuming energy converter, such as a fuel cell for production of electricity (for e.g. propulsion of an electric vehicle) or an internal combustion engine where hydrogen gas can substitute fossil fuel.

A challenge related to the use of hydrogen fuel is safety aspects related to the gas supply system. WO2021018457A1 shows an example of a hydrogen gas supply system presented to be capable of performing emergency emptying of the gas tanks upon detection of a too high temperature. US2020/0091525A1 shows another example where the focus is set on the problem of high impacts to components due to rapid increase of gas pressure when opening a tank shutoff valve.

There is still a need for improvements with regard to safety of hydrogen gas supply systems, for instance with regard to gas leakage in such systems. Leakage safety is of particular importance where the gas supply system is arranged on a vehicle and the vehicle is or is to be moved indoors, such as into a workshop for maintenance.

SUMMARY

An object of the invention is to provide a hydrogen gas supply system capable of reducing the amounts of hydrogen gas released in case there is a leakage in the system. Leakage safety is of particular importance where the gas supply system is arranged on a vehicle and the vehicle is or is to be moved indoors, such as into a workshop for maintenance. This object is achieved by a system.

The invention concerns a hydrogen gas supply system for a hydrogen consuming energy converter arranged onto a vehicle, wherein the hydrogen gas supply system comprises a plurality of tanks for storage of pressurized hydrogen gas, wherein each of said plurality of tanks is provided with a valve configured to control the flow of hydrogen from the corresponding tank into a flow line connected to the hydrogen consuming energy converter, wherein the plurality of tanks comprises one or more primary tanks, each of which being provided with a corresponding primary hydrogen flow control valve, the plurality of tanks further comprising a secondary tank provided with a corresponding secondary hydrogen flow control valve, wherein the hydrogen gas supply system is arranged so that i) the secondary tank contains a smaller maximum working amount of pressurized hydrogen than each of the one or more primary tanks, and/or so that ii) the flow of hydrogen from the secondary tank is restricted so that a maximum mass flow rate of hydrogen flowing from the secondary tank into the flow line when only the secondary valve is open is smaller than the maximum mass flow rate of hydrogen flowing from each of the one or more primary tanks into the flow line when only the corresponding primary valve is open, wherein the hydrogen gas supply system is configured to be set in at least i) a first, normal operation mode wherein at least one primary valve is open and ii) a second, safety operation mode wherein the secondary valve is open and wherein all primary valves are closed.

A system according to the above can be operated in the first mode during normal operation and, for increasing safety and reducing consequences related to leakage, the mode can be switched to the second mode when the vehicle is to be moved indoors, such as into a workshop for vehicle service. Since all primary valves are closed in the second mode and since the risk of hydrogen leakage primarily is associated with the flow line from the tank valves to the hydrogen consumer, any hydrogen leakage when operating in the second mode is likely to be associated only with the secondary tank. By letting the secondary tank contain only a relatively small amount of hydrogen, which can be effected by making the secondary tank relatively small and/or by having a relatively low hydrogen pressure in the secondary tank (as compared to the larger and/or more highly pressurized primary tanks), it is possible to reduce the total amount of hydrogen that can be released if leakage occur (as compared to if one or more of the primary valves would have been open). Alternatively, or as a complement, the flow of hydrogen out from the secondary tank can be restricted so that the mass flow rate of hydrogen flowing out from the secondary tank becomes, say, 10% of that of a primary tank. It then becomes possible to restrict the rate of any hydrogen leakage from the flow line.

The second mode is preferably maintained as long as the vehicle is located indoors. Switching back to the first mode may be done automatically based e.g. on vehicle position data (such as GPS) indicating that the vehicle has moved outdoors or on vehicle speed data indicating that the vehicle moves with a speed above a threshold minimum speed (which is set higher than any reasonable indoor speed).

That the hydrogen gas supply system is arranged so that the secondary tank contains a smaller maximum working amount of pressurized hydrogen than each of the one or more primary tanks means that the secondary tank contains a smaller amount of hydrogen, i.e. a fewer number of hydrogen atoms/molecules, than each of the one or more primary tanks when all of these tanks are filled to an intended working or nominal level.

The system may be adapted so that the maximum amount and/or rate of hydrogen leakage from the secondary tank complies with e.g. regulations set by the authorities. Such regulations may depend on the ventilation rate capabilities of a certain building into which the vehicle is to be driven, which means that the rate of a possible leakage might be more relevant than the total amount of a possible leakage.

Typically, the hydrogen consuming energy converter is a fuel cell system or an internal combustion engine forming part of a drive line of the vehicle where the fuel cell system is used to generate electricity to drive an electric motor for propulsion of the vehicle and where the internal combustion engine uses hydrogen as a fuel similar to conventional engines and generates a mechanical force (via a crankshaft etc.) for propulsion of the vehicle.

In an example, the hydrogen gas supply system contains a plurality of primary tanks having the same size and one secondary tank that is smaller than the primary tanks. Various variants are, however, possible. For instance, there might be only one primary tank, or the primary tanks may be of different size, or there might be more than one secondary tank, or the system may contain some intermediate tank, or the secondary tank may have the same size as the primary tank(s) (but a lower working pressure), etc.

As an example of tank sizes and pressures, the primary tanks may have a working pressure of 350 or 700 bar and a hydrogen storage capacity of maybe 5 kg for passenger cars and 10-100 kg for trucks and construction machinery hydrogen. The secondary tank may be arranged to contain hydrogen sufficient for generating 100 kW electric power in a fuel cell for, say, 5-10 minutes. Assuming that two grams of hydrogen per second is needed for generating this amount of electric power, 120 grams of hydrogen is consumed per minute, which means that the secondary tank should contain 0.6-1.2 kg hydrogen. If the working pressure of the secondary tank is the same as the primary tanks, its gas storage volume may be much smaller than the primary tanks. Even if the working pressure of the secondary tank is lower, it may be smaller than the primary tanks.

If a mass flow rate of hydrogen from the secondary tank of 2 g/s is considered to be sufficient, the maximum mass flow rate of hydrogen flowing from the secondary tank into the flow line when only the secondary valve is open can be set to this value. In contrast, the maximum mass flow rate of hydrogen flowing from each of the one or more primary tanks into the flow line when only the corresponding primary valve is open may be 10 times higher, i.e. in this case 20 g/s. Which mass flow rates and restrictions that are suitable depend on the application.

The hydrogen gas supply system may comprise a high pressure side in connection with the one or more primary tanks and a low pressure side in connection with the hydrogen consumer, with a pressure regulation device arranged somewhere there-between. That is, the pressure in the flow line is higher close to the primary tank(s) compared to close to the hydrogen consumer. In such a case, the secondary tank may be arranged in fluid communication with the flow line on either the high or low pressure side. For efficiency and safety reasons, it is believed that it is more advantageous to arrange the secondary tank in fluid communication with high pressure side of the flow line.

In an embodiment, a gas storage volume of the secondary tank is smaller than that of each of the one or more primary tanks.

In an embodiment, a pressure of the hydrogen gas is lower in the secondary tank than in each of the one or more primary tanks when the primary and secondary tanks are filled with pressurized hydrogen up to a maximum working level.

In an embodiment, each of the one or more primary tanks is designed to withstand a higher internal gas pressure than the secondary tank. This means that the secondary tank is designed to withstand a lower pressure, which in turn means that the secondary tank can be produced in a more cost-efficient way; it may for instance be made in a less costly material.

In an embodiment, the secondary tank is provided with a nozzle member configured to restrict the maximum mass flow rate of hydrogen flowing from the secondary tank into the flow line when the secondary valve is open. Additional nozzle members and valves may be arranged in a stepwise manner to provide for a controllable flow from the secondary tank (and not just on/off, open/closed). Where the hydrogen consumer is a fuel cell, it is not necessary to control operation of the fuel cell when the gas supply system is set in the second, safety mode as the maximum mass flow rate set by the nozzle member sets the maximum power of the fuel cell.

In an embodiment, the hydrogen gas supply system further comprises a replenishment gas conduit arranged between the one or more primary tanks and the secondary tank so as to allow replenishment of the secondary tank with hydrogen gas flowing from the one or more primary tanks. With such a gas conduit the secondary tank does not have to be replenished from an external source.

In an embodiment, the replenishment gas conduit is provided with a replenishment valve configured to control the flow of hydrogen to the secondary tank, wherein the replenishment valve is closed when the hydrogen gas supply system is set in the second operation mode. A control system is preferable configured to control the replenishment valve based on e.g. a signal from a pressure sensor arranged to indicate the pressure in the secondary tank.

In an embodiment, the hydrogen gas supply system comprises a plurality of primary tanks.

In an embodiment, the hydrogen gas supply system comprises only one secondary tank.

In an embodiment, the hydrogen gas supply system comprises a control unit arranged to control the hydrogen gas supply system. The control unit is preferably connected to various sensors, such as pressure, temperature and hydrogen leakage sensors, and configured to control all valves in the hydrogen gas supply system based on sensor signal input and other input. The control unit may be connected to other control units, or form part of a higher-level control system or control circuitry, so as to be involved also in the control of the hydrogen consumer and a vehicle onto which the hydrogen gas supply system is arranged.

In particular, the control unit is configured to switch operation mode of the hydrogen gas supply system between the first and second modes. This switch of mode may be done as a response to a manual user input but may alternatively be done as a response to sensor input, such as a signal from a hydrogen sensor indicating hydrogen leakage (in which case the response alternatively may be to close all valves in the system).

For vehicle applications, the control unit may be configured to automatically set the hydrogen gas supply system in the second mode (the safety mode) when the vehicle is or is about to be located inside a building, for instance based on vehicle position data obtained from a vehicle control unit. Further, in vehicle applications the control unit may further be configured to automatically set the hydrogen gas supply system in the first mode (the normal operation mode) when the vehicle has moved out from the building or when the vehicle has reached a certain threshold minimum speed (e.g. based on input from the vehicle control unit).

The control unit may further be configured to switch to the second mode (or close all valves in the system) when receiving a signal indicating some sort of malfunctioning of the hydrogen consumer.

When operating the hydrogen gas supply system in the first mode (the normal operation mode), the control unit may control the valves in such a manner that only one of the primary valves is open simultaneously.

The invention further concerns a vehicle comprising a hydrogen consuming energy converter and a hydrogen gas supply system of the above type, wherein the hydrogen gas supply system is arranged to supply the energy converter with hydrogen.

In an embodiment, the hydrogen consuming energy converter forms part of a drive system arranged for propulsion of the vehicle.

In an embodiment, the hydrogen consuming energy converter is a fuel cell system or an internal combustion engine.

In an embodiment, the hydrogen gas supply system is configured to switch between the first and second operation modes depending on location and/or speed of the vehicle.

The invention also concerns a method for operating a hydrogen gas supply system of the above type, the method comprising: operating the hydrogen gas supply system in a first operation mode wherein at least one primary valve is open, and switching operation mode so as to operate the hydrogen gas supply system in a second operation mode wherein the secondary valve is open and wherein all primary valves are closed.

In an embodiment of the method, the hydrogen gas supply system is arranged onto a vehicle and the method comprises: switching operation mode to the second operation mode in association with moving the vehicle inside a building; and operating the hydrogen gas supply system in the second operation mode when the vehicle is inside the building.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
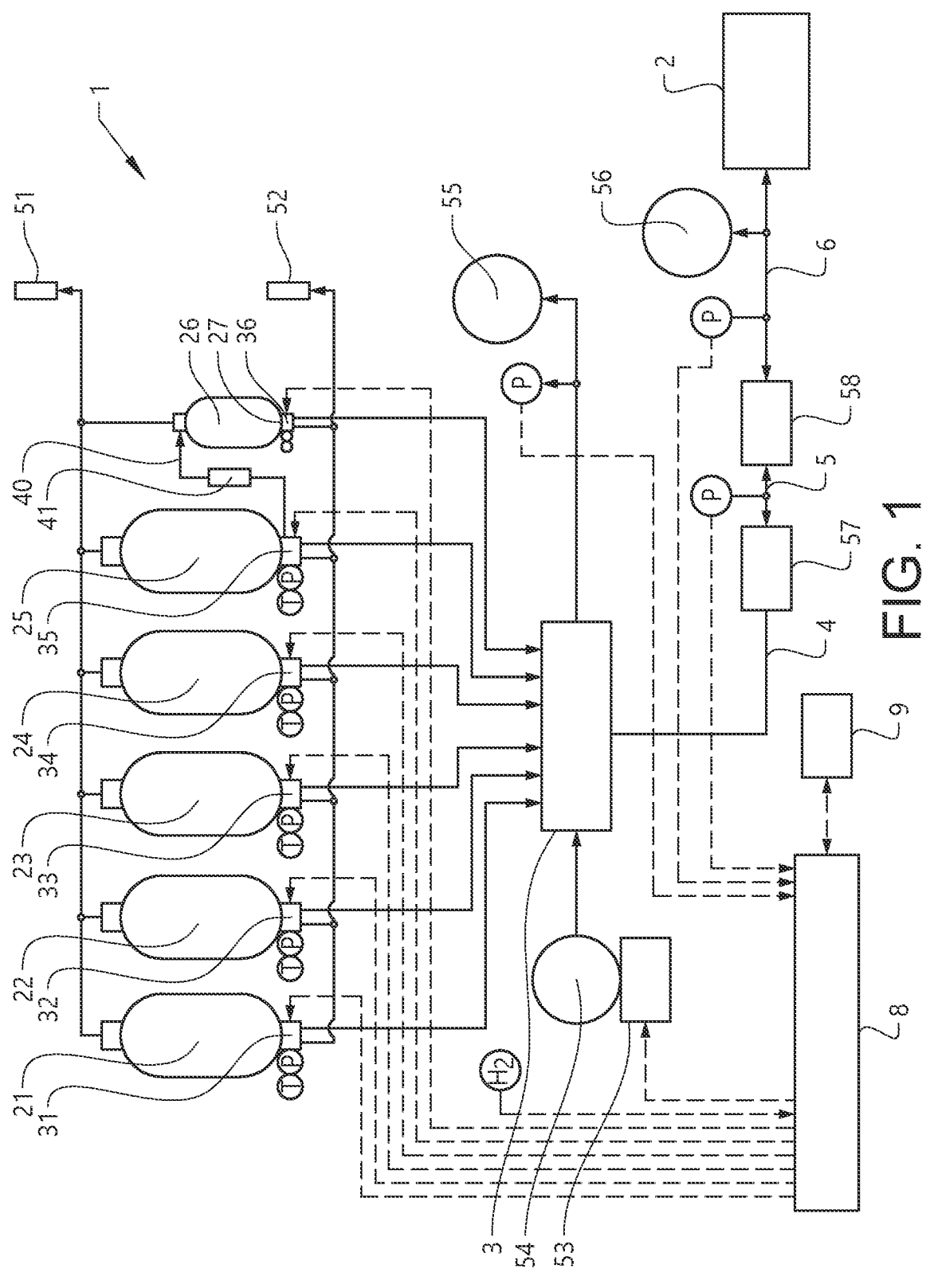
FIG. 1 shows, in a schematic view, an exemplary embodiment of a hydrogen gas supply system according to this disclosure.

FIG. 1 shows a hydrogen gas supply system 1 for a hydrogen consuming energy converter 2 in the form of a fuel cell stack or an internal combustion engine 2. As exemplified in FIG. 2, the hydrogen gas supply system 1 and the hydrogen consuming energy converter are intended to be arranged onto a vehicle 10 and form part of a driveline thereof.

The hydrogen gas supply system 1 comprises a plurality of tanks 21-26 for storage of pressurized hydrogen gas, and each of said plurality of tanks 21-26 is provided with a valve 31-36 configured to control the flow of hydrogen from the corresponding tank 31-36 into a flow line 3-6 connected to the hydrogen consuming energy converter 2.

The flow line comprise in this example a manifold 3 common for all tanks 21-26, a high pressure conduit 4, an intermediate conduit 5 and a low pressure conduit 6.

The hydrogen gas supply system 1 is further provided with a first outlet 51 for manual emptying of the high pressure side and the tanks, a second outlet 52 for emptying of the high pressure side and the tanks in case a pressure or temperature safety valve is opened, a communication interface 53 based on e.g. IR or Wifi for use when refilling the tanks, a connector for refilling of hydrogen 54, a first pressure gauge for high pressure side 55, a second pressure gauge for low pressure side 56, a high pressure regulator 57 and a low pressure regulator 58.

The plurality of tanks comprises in this case five primary tanks 21-25, each of which being provided with a corresponding primary hydrogen flow control valve 31-35. The plurality of tanks further comprises one secondary tank 26 provided with a corresponding secondary hydrogen flow control valve 36.

The hydrogen gas supply system 1 is arranged so that the secondary tank 26 contains a smaller maximum working amount of pressurized hydrogen than each of the five primary tanks 21-25, i.e. when all tanks 21-26 are filled up to a maximum working level, the secondary tank 26 contains a smaller amount of hydrogen than each of the primary tanks 21-25. As indicated in FIG. 1, a gas storage volume of the secondary tank 26 is smaller than that of each of the one or more primary tanks 21-25. This leads to smaller working amount of pressurized hydrogen in the secondary tank 26 than in each of the primary tanks 21-25 if the hydrogen pressure is the same in all tanks 21-26.

To further reduce the hydrogen content in the secondary tank 26, the pressure of the hydrogen gas is lower in the secondary tank 26 than in each of the primary tanks 21-25 when the primary and secondary tanks are filled with pressurized hydrogen up to the maximum working level. Each of the primary tanks 21-25 is designed to withstand a higher internal gas pressure than the secondary tank 26, which means that the secondary tank 26 can have a less sophisticated design and thus be manufactured in a less costly way.

The hydrogen gas supply system 1 is further arranged so that the flow of hydrogen from the secondary tank 26 is restricted so that a maximum mass flow rate of hydrogen flowing from the secondary tank 26 into the flow line 3-6 when only the secondary valve 36 is open is smaller than the maximum mass flow rate of hydrogen flowing from each of the one or more primary tanks 21-25 into the flow line when only the corresponding primary valve 31-35 is open. This is achieved by providing the secondary tank 26 is provided with a nozzle element 27 configured to restrict the maximum mass flow rate of hydrogen flowing from the secondary tank 26 into the flow line 3-6 when the secondary valve 36 is open. That is, the nozzle element 27 restricts the outflow from the secondary tank 26 more than the outflow is restricted from the primary tanks 21-25.

The hydrogen gas supply system 1 further comprises a control unit 8 arranged to control the system. The control unit 8 is connected to various hydrogen, temperature and pressure sensors and is capable of controlling e.g. opening and closing of the valves 31-36 based on sensor signals and other control signals. The control unit 8 is further connected to a vehicle control unit 9 configured to, for instance, provide the gas supply system control unit 8 with vehicle information, such as speed and location, and control the hydrogen consuming energy converter 2. The two control units 8, 9 may form part of one common control circuitry.

The hydrogen gas supply system 1 is configured to be set in at least i) a first, normal operation mode wherein at least one primary valve 31-35 is open and ii) a second, safety operation mode wherein the secondary valve 36 is open and wherein all primary valves 31-35 are closed. The switching of mode is controlled by the supply system control unit 8. In other embodiments, switching of modes may alternatively be carried out manually using e.g. needle valves.

The first mode is used during normal operation, such as normal operation of a vehicle where the hydrogen consuming energy converter 2 provides vehicle driving power (electrical power if the converter is a fuel cell or mechanical power if the converter is an internal combustion engine). The control unit 8 may be configured to keep only one primary valve 31-35 open simultaneously when operating in the first mode so as to reduce leakage of hydrogen if leakage occurs during operation according to the first mode.

The second mode is used when there is of particular importance that a significant leakage of hydrogen is avoided, such as when a vehicle provided with the system shown in FIG. 1 is inside a building. When the hydrogen gas supply system 1 is operated in this second mode, the safety mode, the maximum amount of hydrogen that can leak from the flow line 3-6 is set by the maximum working amount of hydrogen in the secondary tank 26, which is less than the maximum working amount of hydrogen in each of the primary tanks 21-25. Thus, switching to the second mode reduces the amount of hydrogen that may be released if leakage occurs.

In addition, since the maximum mass flow rate of hydrogen from the secondary tank 26 is restricted and lower than from each of the primary tanks 21-25, also the potential maximum leakage rate from the flow line 3-6 is reduced when switching to the second mode. Whether the leakage amount or leakage rate is of highest importance may depend on the size and/or ventilation capacity of the building inside which the vehicle is (to be) located.

As shown in FIG. 1, the hydrogen gas supply system 1 further comprises a replenishment gas conduit 40 arranged between one of the primary tanks 25 and the secondary tank 26 so as to allow replenishment of the secondary tank 26 with hydrogen gas flowing from the primary tank 25. The replenishment gas conduit 40 is provided with a replenishment valve 41 configured to control the flow of hydrogen to the secondary tank 26. The replenishment valve 41 is closed when the hydrogen gas supply system 1 is set in the second operation mode.

Figure 2:
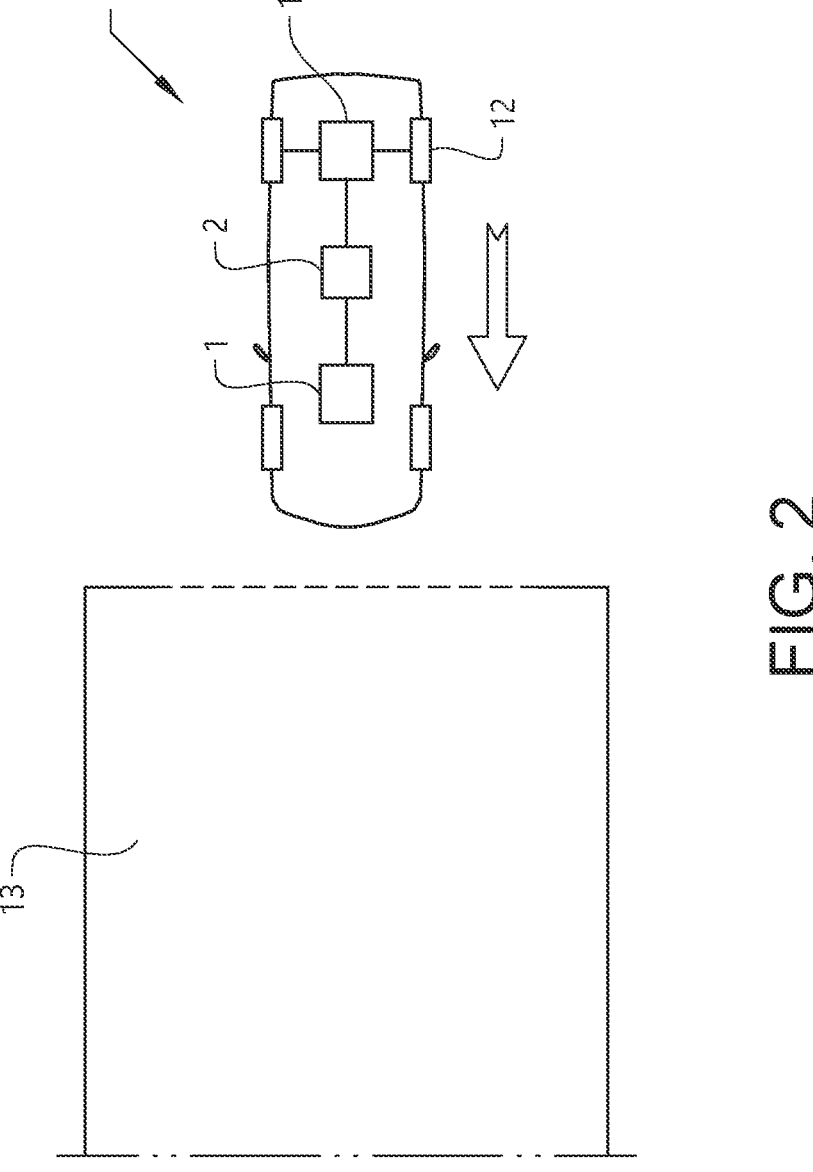
FIG. 2 shows, in a schematic view, shows a vehicle provided with a hydrogen gas supply system according to this disclosure, wherein the hydrogen gas supply system forms part of a drive line of the vehicle.

FIG. 2 shows a vehicle 10 comprising a hydrogen consuming energy converter 2 and a hydrogen gas supply system 1 according to above, where the hydrogen gas supply system 1 is arranged to supply the energy converter 2 with hydrogen. The hydrogen gas supply system 1 and hydrogen consuming energy converter 2 form part of a drive system arranged for propulsion of the vehicle 10. In the schematic example shown in FIG. 2 the hydrogen consuming energy converter 2 is intended to indicate a fuel cell stack providing electricity to an electric motor 11 that rotates driving wheels 12. FIG. 2 can alternatively be considered to illustrate a hydrogen gas supply system 1 feeding hydrogen to an internal combustion engine 2 that is connected to the driving wheels 12 via transmission 11.

The hydrogen gas supply system 1 may be configured to switch between the first and second operation modes depending on location and/or speed of the vehicle 10. For instance, the vehicle control unit 9 may send vehicle positioning data, such as GPS data, to the gas supply system control unit 8 indicating, together with map data accessible for the system control unit 8, that the vehicle 10 is about to enter a building 13, such as a vehicle workshop. As a response, the gas supply system control unit 8 may set the hydrogen gas supply system 1 in the second mode. When the vehicle 10 has exited the building and has reached a certain threshold speed, the supply system control unit 8, based on e.g. speed information from the vehicle control unit 9, may set the hydrogen gas supply system 1 in the first mode. Switching of modes may alternatively be done manually by e.g. a driver of the vehicle.

A method for operating the hydrogen gas supply system 1 according to above may comprise the following steps:
operating the hydrogen gas supply system 1 in the first operation mode wherein at least one primary valve 31-35 is open, and
switching operation mode so as to operate the hydrogen gas supply system 1 in the second operation mode wherein the secondary valve 36 is open and wherein all primary valves 31-35 are closed.

When the hydrogen gas supply system 1 is arranged onto the vehicle 10, the method may comprise:
switching operation mode to the second operation mode in association with moving the vehicle 10 inside the building 13; and
operating the hydrogen gas supply system 1 in the second operation mode when the vehicle 10 is inside the building 13.

It is to be understood that the present invention is not limited to the embodiments described above and illustrated in the drawings; rather, the skilled person will recognize that many changes and modifications may be made within the scope of the appended claims.

For instance, it is not necessary that the secondary tank 26 is both smaller (i.e. has a smaller gas storage volume) and has a lower maximum working pressure than the primary tanks 21-25. Neither is it necessary that the secondary tank both contains a smaller amount of hydrogen than the primary tanks and has a more restricted outflow. However, combining these safety measures improves the safety, as exemplified by the system shown in FIG. 1.

The invention claimed is:
1. A vehicle comprising a hydrogen gas supply system and a hydrogen consuming energy converter,
wherein the hydrogen gas supply system is arranged to supply the hydrogen consuming energy converter with hydrogen,
wherein the hydrogen gas supply system comprises a plurality of tanks for storage of pressurized hydrogen gas,
wherein each of the plurality of tanks is provided with a valve configured to control the flow of hydrogen from the corresponding tank into a flow line connected to the hydrogen consuming energy converter,
wherein the plurality of tanks comprises one or more primary tanks, each of which being provided with a corresponding primary hydrogen flow control valve, the plurality of tanks further comprising a secondary tank provided with a corresponding secondary hydrogen flow control valve,
wherein the hydrogen gas supply system is arranged:
so that the secondary tank contains a smaller maximum working amount of pressurized hydrogen than each of the one or more primary tanks, and/or
so that the flow of hydrogen from the secondary tank is restricted so that a maximum mass flow rate of hydrogen flowing from the secondary tank into the flow line when only the secondary valve is open is smaller than the maximum mass flow rate of hydrogen flowing from each of the one or more primary tanks into the flow line when only the corresponding primary valve is open, and
wherein the hydrogen gas supply system is configured to be set in at least:

a first, normal operation mode wherein at least one primary valve is open, and a second, safety operation mode wherein the secondary valve is open and wherein all primary valves are closed, wherein the hydrogen gas supply system comprises a vehicle control unit arranged to control the hydrogen gas supply system, the vehicle control unit being configured to automatically switch operation mode from the first operation mode to the second operation mode when the vehicle is or is about to be located inside a building based on vehicle position data obtained from the vehicle control unit.

2. The vehicle of claim 1, wherein a gas storage volume of the secondary tank is smaller than that of each of the one or more primary tanks.

3. The vehicle of claim 1, wherein a pressure of the hydrogen gas is lower in the secondary tank than in each of the one or more primary tanks when the primary and the secondary tanks are filled with pressurized hydrogen up to a maximum working level.

4. The vehicle of claim 1, wherein each of the one or more primary tanks is designed to withstand a higher internal gas pressure than the secondary tank.

5. The vehicle of claim 1, wherein the secondary tank is provided with a nozzle element configured to restrict the maximum mass flow rate of hydrogen flowing from the secondary tank into the flow line when the secondary valve is open.

6. The vehicle of claim 1, wherein the system further comprises a replenishment gas conduit arranged between the one or more primary tanks and the secondary tank so as to allow replenishment of the secondary tank with hydrogen gas flowing from the one or more primary tanks.

7. The vehicle of claim 6, wherein the replenishment gas conduit is provided with a replenishment valve configured to control the flow of hydrogen to the secondary tank, wherein the replenishment valve is closed when the hydrogen gas supply system is set in the second operation mode.

8. The vehicle of claim 1, wherein the system comprises a plurality of primary tanks.

9. The vehicle of claim 1, wherein the system comprises only one secondary tank.

10. The vehicle of claim 1, wherein the vehicle control unit is configured to automatically set the hydrogen gas supply system in the first operation mode when the vehicle has moved out from the building or when the vehicle has reached a certain threshold minimum speed.

11. The vehicle of claim 1, wherein the hydrogen consuming energy converter forms part of a drive system arranged for propulsion of the vehicle.

12. The vehicle of claim 1, wherein the hydrogen consuming energy converter is a fuel cell system or an internal combustion engine.

13. The vehicle of claim 1, wherein the hydrogen gas supply system is configured to switch between the first and the second operation modes depending on location and/or speed of the vehicle.

14. A method for operating a hydrogen gas supply system, wherein the hydrogen gas supply system is arranged to supply hydrogen to a hydrogen consuming energy converter, wherein the hydrogen gas supply system and the hydrogen consuming energy converter are arranged onto a vehicle, wherein the hydrogen gas supply system comprises a plurality of tanks for storage of pressurized hydrogen gas, wherein each of said plurality of tanks is provided with a valve configured to control the flow of hydrogen from the corresponding tank into a flow line connected to the hydrogen consuming energy converter, wherein the plurality of tanks comprises one or more primary tanks, each of which being provided with a corresponding primary hydrogen flow control valve, the plurality of tanks further comprising a secondary tank provided with a corresponding secondary hydrogen flow control valve, wherein the hydrogen gas supply system is arranged:

so that the secondary tank contains a smaller maximum working amount of pressurized hydrogen than each of the one or more primary tanks, and/or so that the flow of hydrogen from the secondary tank is restricted so that a maximum mass flow rate of hydrogen flowing from the secondary tank into the flow line when only the secondary valve is open is smaller than the maximum mass flow rate of hydrogen flowing from each of the one or more primary tanks into the flow line when only the corresponding primary valve is open, and wherein the hydrogen gas supply system is configured to be set in at least a first, normal operation mode wherein at least one primary valve is open and a second, safety operation mode wherein the secondary valve is open and wherein all primary valves are closed, the method comprising:

operating the hydrogen gas supply system in the first operation mode, switching operation modes to the second operation mode in association with moving the vehicle inside a building, and operating the hydrogen gas supply system in the second operation mode when the vehicle is inside the building.

15. The method of claim 14, wherein the hydrogen gas supply system comprises a vehicle control unit arranged to control the hydrogen gas supply system, and wherein the vehicle control unit is configured to switch operation modes in response to a manual user input or automatically when the vehicle is or is about to be located inside a building based on vehicle position data obtained from the vehicle control unit.

16. The method of claim 14, wherein the hydrogen gas supply system comprises a vehicle control unit arranged to control the hydrogen gas supply system, and wherein the vehicle control unit is configured to automatically set the hydrogen gas supply system in the first operation mode when the vehicle has moved out from the building or when the vehicle has reached a certain threshold minimum speed.

* * * * *